US012237117B2

(12) United States Patent
Inoue (10) Patent No.: US 12,237,117 B2
(45) Date of Patent: Feb. 25, 2025

(54) CAPACITOR, CAPACITOR MANUFACTURING METHOD, AND CAPACITOR MOUNTING METHOD

(71) Applicant: NIPPON CHEMI-CON CORPORATION, Tokyo (JP)

(72) Inventor: Ryuuta Inoue, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 159 days.

(21) Appl. No.: 17/910,117

(22) PCT Filed: Mar. 25, 2021

(86) PCT No.: PCT/JP2021/012450
§ 371 (c)(1),
(2) Date: Sep. 8, 2022

(87) PCT Pub. No.: WO2021/193793
PCT Pub. Date: Sep. 30, 2021

(65) Prior Publication Data
US 2023/0114631 A1    Apr. 13, 2023

(30) Foreign Application Priority Data
Mar. 26, 2020   (JP) .................................. 2020-055815

(51) Int. Cl.
*H01G 9/12*   (2006.01)
*H01G 2/02*   (2006.01)
(Continued)

(52) U.S. Cl.
CPC ................. *H01G 9/12* (2013.01); *H01G 2/02* (2013.01); *H01G 2/06* (2013.01); *H01G 9/012* (2013.01); *H01G 9/10* (2013.01); *H01G 11/78* (2013.01)

(58) Field of Classification Search
None
See application file for complete search history.

(56) References Cited

U.S. PATENT DOCUMENTS

| 6,898,066 B1 * | 5/2005 | Lin ......................... H01G 9/10 |
| | | 361/519 |
| 2019/0198251 A1 | 6/2019 | Inoue et al. |
| | (Continued) | |

FOREIGN PATENT DOCUMENTS

| JP | H06-338439 A | 12/1994 |
| JP | 2019-186245 A | 10/2019 |
| | (Continued) | |

OTHER PUBLICATIONS

Office Action dated Jan. 23, 2024, issued in counterpart JP application No. 2020-055815, with English translation. (7 pages).
(Continued)

*Primary Examiner* — Eric W Thomas
(74) *Attorney, Agent, or Firm* — WHDA, LLP (57) ABSTRACT

A capacitor (2) includes a capacitor main body (4), a base (6), and a resin layer (8-1). The capacitor main body includes an outer package case (10), an opening sealing member (14) attached to an opening of the outer package case, and a terminal lead (16-1, 16-2) extending through the opening sealing member. The base is disposed toward the opening sealing member of the capacitor main body and includes an insertion through hole (18-1, 18-2) into which the terminal lead is inserted to be exposed on a mounting surface side, and a protruding portion (20) surrounding the insertion through hole. The resin layer is arranged at least between the base and the opening sealing member. The base and the resin layer are in contact with or spaced apart from each other without at least partly adhering to each other.

17 Claims, 5 Drawing Sheets

(51) Int. Cl.
- *H01G 2/06* (2006.01)
- *H01G 9/012* (2006.01)
- *H01G 9/10* (2006.01)
- *H01G 11/78* (2013.01)

(56) References Cited

U.S. PATENT DOCUMENTS

2020/0411252 A1 12/2020 Masuda et al.
2021/0142950 A1 5/2021 Inoue et al.

FOREIGN PATENT DOCUMENTS

| JP | 2019-186271 | A | | 10/2019 | |
|----|----|----|----|----|----|
| WO | 2018/062411 | A1 | | 4/2018 | |
| WO | 2019/045072 | A1 | | 3/2019 | |
| WO | WO-2019189160 | A1 | * | 10/2019 | ............... H01G 2/02 |
| WO | WO-2019194153 | A1 | * | 10/2019 | |

OTHER PUBLICATIONS

Notification Concerning Transmittal of International Preliminary Report on Patentability (Forms PCT/IB/326) issued in counterpart International Application No. PCT/JP2021/012450 mailed Oct. 6, 2022 with Forms PCT/IB/373, PCT/IB/338 and PCT/ISA/237. (12 pages).

Extended (Supplementary) European Search Report dated May 27, 2024, issued in counterpart EP Application No. 21774747.6. (10 pages).

Office Action dated Jul. 4, 2024, issued in counterpart TW Application No. 110110842, with partial English translation. (13 pages).

Office Action dated Aug. 1, 2024, issued in counterpart CH Application No. 202180019948.X, with English translation. (16 pages).

International Search Report dated Jun. 15, 2021, issued in counterpart International Application No. PCT/JP2021/012450, with English Translation. (5 pages).

Japanese Written Opinion of the International Searching Authority (Form PCT/ISA/237) dated Jun. 15, 2021, issued in counterpart International Application No. PCT/JP2021/012450 (4 pages).

* cited by examiner

CAPACITOR, CAPACITOR MANUFACTURING METHOD, AND CAPACITOR MOUNTING METHOD

TECHNICAL FIELD

The present disclosure relates to a capacitor having a base, a method for manufacturing the capacitor, and a method for mounting the capacitor.

BACKGROUND ART

A capacitor includes a base for example, and terminal leads of the capacitor being pulled out to an outer side surface of the base and folded thereon are to be soldered to a wiring board such as a circuit board, for example. The capacitor used for this type of mounting is called "surface-mount capacitor". The surface-mount capacitor has high general versatility and is used in an automobile for example.

When a capacitor is disposed outdoors such as the inside of an automobile, the environmental temperature around the position at which the capacitor is disposed rises. The capacitor therefore needs to withstand a high temperature environment. For example, a resin layer is formed between an opening sealing member and a base of the capacitor to thereby enhance the sealability of the capacitor (see, e.g. Patent Literature 1). According to this configuration, the heat resistance of the capacitor can be improved. The base of such a capacitor includes insertion through holes so that terminal leads of the capacitor pass through the insertion through holes to be arranged on the outer side, i.e. the mount surface side of the base. If the base further includes a protruding portion that separates the insertion through holes and the resin layer, the protruding portion suppresses flowing-in of resin for generating the resin layer to the insertion through holes. That is, resin for forming the resin layer is prevented from flowing out to the outside of the capacitor through the insertion through holes, suppressing adverse effects on mounting of the capacitor.

CITATION LIST

Patent Literature

Patent Literature 1: International Publication No. WO2018/062411

SUMMARY OF INVENTION

Technical Problem

If there occurs a gap between the resin layer and the outer side of the opening sealing member, electrolytic solution gas having passed through the opening sealing member may reach this gap to return to electrolytic solution. If electrolytic solution having conductive properties stays between the terminal leads of the capacitor, insulation resistance between the terminal leads may lower, which may impair the capacitor reliability.

A first object of the technique of the present disclosure is to suppress the stay of electrolytic solution in a gap which may occur between the resin layer and the outer side of the opening sealing member, to thereby suppress lowering of the insulation resistance.

A second object of the technique of the present disclosure is to suppress decrease in reliability of the capacitor.

Solution to Problem

According to a first aspect of the present disclosure, a capacitor includes a capacitor main body, a base, and a resin layer. The capacitor main body includes an outer package case, an opening sealing member attached to an opening of the outer package case, and a terminal lead extending through the opening sealing member. The base is disposed toward the opening sealing member of the capacitor main body and includes an insertion through hole into which the terminal lead is inserted to be exposed on a mounting surface side, and a protruding portion surrounding the insertion through hole. The resin layer is arranged at least between the base and the opening sealing member. The base and the resin layer are in contact with or spaced apart from each other without at least partly adhering to each other. Alternatively, an adhesive force of the resin layer to the base is smaller than a force that thermal deformation at a mounting processing is to generate between the base and the resin layer.

In the above capacitor, the adhesive force of the resin layer to the base may be smaller, at least partly, than an adhesive force of the resin layer to the opening sealing member.

In the above capacitor, a difference in expansion coefficient between the base and the resin layer may be greater than a difference in expansion coefficient between the opening sealing member and the resin layer.

In the above capacitor, a boundary portion between the base and the resin layer may include contact surfaces, spaced-apart surfaces, or contact surfaces and spaced-apart surfaces, of the base and the resin layer, and the boundary portion may form a gas path for allowing passage of gas.

In the above capacitor, a boundary portion between the protruding portion and the opening sealing member may communicate via the gas path to exterior of the capacitor.

In the above capacitor, the resin layer may further be arranged within interior of the insertion through hole.

In the above capacitor, the base may further include a circumferential wall arranged outside of the outer package case. The resin layer may further be arranged between the circumferential wall and the outer package case.

According to a second aspect of the present disclosure, a capacitor manufacturing method includes: making a capacitor main body including an outer package case, an opening sealing member attached to an opening of the outer package case, and a terminal lead extending through the opening sealing member; making a base including an insertion through hole and a protruding portion surrounding the insertion through holes; disposing the base toward the opening sealing member of the capacitor main body and inserting the terminal lead into the insertion through hole to be exposed on a mounting surface side; and forming a resin layer between the base and the opening sealing member. The base and the resin layer are in contact with or spaced apart from each other without at least partly adhering to each other. Alternatively, an adhesive force of the resin layer to the base is smaller than a force that thermal deformation at a mounting processing is to generate between the base and the resin layer.

According to a third aspect of the present disclosure, a capacitor mounting method includes: a fitting step of fitting the above capacitor to a circuit board via solder; and a reflow step of subjecting the solder to heat treatment to join the circuit board and the capacitor together. The heat treatment separates the base from the resin layer so that a gas path is formed.

Advantageous Effects of Invention

According to the technique of the present disclosure, one of the following effects can be obtained.
(1) The base and the resin layer are in contact with or spaced apart from each other without at least partly adhering to each other, or the adhesive force of the resin layer to the base is smaller than the force that the thermal deformation at the mounting processing is to generate between the base and the resin layer. Thus, electrolyte gas having passed through the opening sealing member can flow through the boundary portion between the base and the resin layer at portions in contact or spaced-apart without adhesion and can be exhausted to the exterior of the capacitor. At a portion where the adhesive force of the resin layer to the base is smaller than the force that the thermal deformation at the mounting processing is to generate between the base and the resin layer, the resin layer separates from the base due to heating during the mounting processing. For this reason, electrolyte gas having passed through the opening sealing member can flow through the boundary portion between the base and the resin layer of the capacitor after heating and can be exhausted to the exterior of the capacitor.
(2) The electrolyte gas stay is suppressed between the terminal leads, thereby making it possible to avoid lowering in the insulation resistance.
(3) The base and the resin layer are in contact with or spaced apart from each other without at least partly adhering to each other, or the adhesive force of the resin layer to the base is smaller than the force that the thermal deformation at the mounting processing is to generate between the base and the resin layer. Thus, since the resin layer separates from the base at least in the state where the capacitor is mounted on the wiring board such as the circuit board, force applied to the boundary portion between the opening sealing member and the resin layer decreases, keeping adhesion of the resin layer to the opening sealing member. Consequently, the adhered portions of the resin layer and the opening sealing member can suppress transpiration of electrolyte, achieving enhanced capacitor stability.

DESCRIPTION OF EMBODIMENTS

Embodiments and the like will hereinafter be described with reference to the drawings.

First Embodiment

Figure 1:
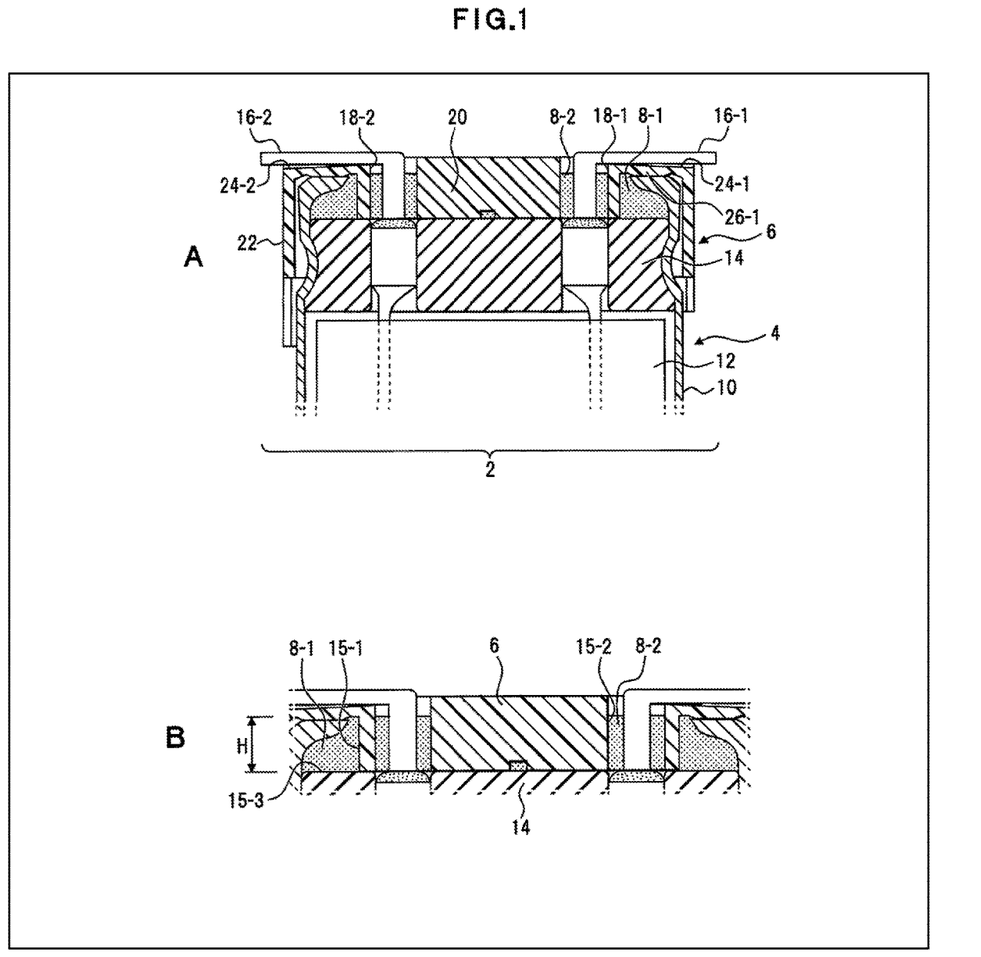
FIG. 1 shows section views of an example of a capacitor according to a first embodiment.
Figure 2:
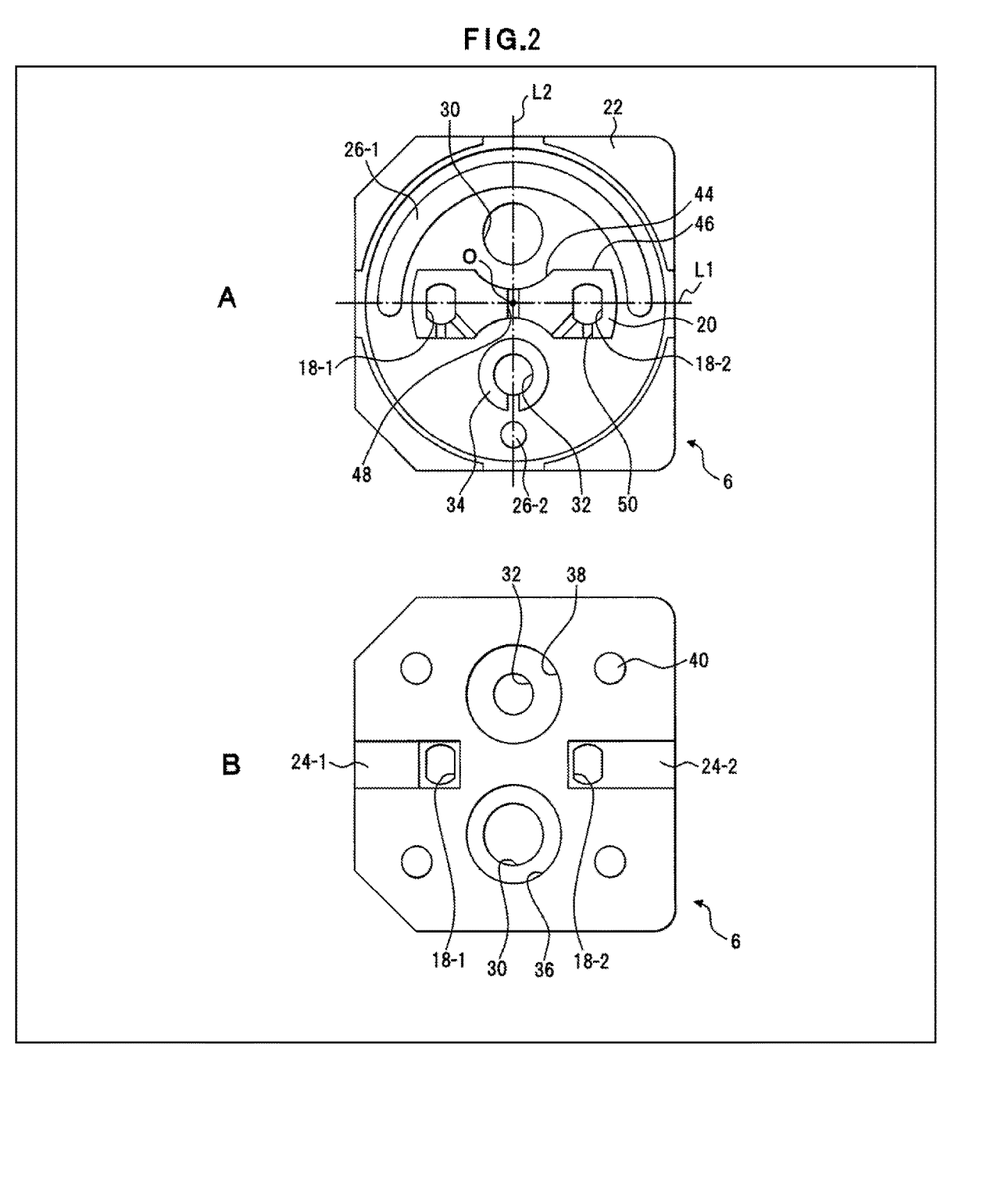
FIG. 2 shows views of a base of the capacitor.

A of FIG. 1 is a section view showing an example of a capacitor according to a first embodiment, while B of FIG. 1 is a partial enlarged view of A of FIG. 1. In FIG. 1, a part of a capacitor main body is not shown. A of FIG. 2 is a plan view of a base of the capacitor, showing a main body disposition surface disposed on a capacitor main body, i.e. a surface portion of the base toward an opening sealing member. B of FIG. 2 is a bottom view of the base, showing a surface opposite to the main body disposition surface, i.e. an outside surface and a mounting surface of the base. The base shown in A of FIG. 2 has a virtual line L1, an intermediate point O, and a center line L2, added thereto for explanation of the base. The configurations shown in FIGS. 1 and 2 are mere examples and the technique of the present disclosure is not limited to such configurations.

A capacitor 2 is an example of an electronic component and is e.g. an electrolytic capacitor or an electric double-layer capacitor. The capacitor 2 includes a capacitor main body 4, a base 6, and resin layers 8-1 and 8-2. The capacitor main body 4 includes an outer package case 10, a capacitor element 12, and an opening sealing member 14. The base 6 is disposed toward the opening sealing member 14 of the capacitor main body 4. The resin layer 8-1 is arranged in a gap defined between the base 6 and the capacitor main body 4, while the resin layer 8-2 is arranged within the interior of insertion through holes 18-1 and 18-2 formed in the base 6. The capacitor 2 is mountable on a wiring board such as a circuit board.

The resin layer 8-1 faces the base 6 via a boundary portion 15-1, while the resin layer 8-2 faces the base 6 via a boundary portion 15-2. The boundary portions 15-1 and 15-2 are boundaries between the base 6 and the resin layers 8-1 and 8-2 and are formed by a facing surface of the base 6 and facing surfaces of the resin layers 8-1 and 8-2. The base 6 and the resin layers 8-1 and 8-2 may be in contact with or spaced apart from each other without adhering at least partly, and an adhesive force of the resin layers 8-1 and 8-2 to the base 6 may be smaller at least partly than a force occurring at the boundary portions 15-1 and 15-2 at a mounting processing temperature. At the time of mounting processing, i.e. at the step of mounting the capacitor 2 on the wiring board, the capacitor 2 and the wiring board are heated to the mounting processing temperature. Accordingly, at least one of the base 6 or the resin layers 8-1 and 8-2 is subjected to thermal deformation such as expansion or contraction, and the thermal deformation brings a force between the base 6 and the resin layers 8-1 and 8-2. The force caused by the thermal deformation is e.g. a force to peel off the resin layers 8-1 and 8-2 from the base 6. The step of mounting the capacitor 2 on the wiring board includes e.g. a heating step such as a reflow step, and the mounting processing temperature is a temperature of the capacitor 2 or around the capacitor 2 at the heating step and is e.g. 260° C. The force occurring at the boundary portions 15-1 and 15-2 is caused by e.g. an expansion difference between the base 6 and the resin layers 8-1 and 8-2 at the mounting processing temperature. In a portion (hereinafter, referred to as "contact portion") where the base 6 and one of the resin layers 8-1 and 8-2 are in contact with each other without adhering to each other, the base 6 and one of the resin layers 8-1 and 8-2 are e.g. in contact with each other, instead of being held together by hydrogen-bonding, bonding by intermolecular force such as Van der Waals force, or concavo-convex mechanical coupling, so that one of the boundary portions 15-1 and 15-2 forms contact surfaces. In a portion (hereinafter, referred to as "spaced-apart portion" where the base 6 and the resin layers 8-1 and 8-2 are spaced apart from each other, the resin layers 8-1 and 8-2 may be spaced apart from the base 6, so that one of the boundary portions 15-1 and 15-2 may form spaced-apart surfaces. In a portion where the base 6 and one of the resin layers 8-1 and 8-2 adhere to each other, i.e. in a portion other than the contact portion and the spaced-apart portion described, one of the resin layers 8-1 and 8-2 adheres to the base 6 by hydrogen-bonding, bonding by intermolecular force such as Van der Waals force, or concavo-convex mechanical coupling, so that one of the boundary portions 15-1 and 15-2 forms adhered surfaces. Each of the boundary portions 15-1 and 15-2 may be the contact surfaces, may be the spaced-apart surfaces, may be the adhered surfaces, or may be a plurality of surfaces of these surfaces.

It is preferred that the adhesive force of the resin layers 8-1 and 8-2 to the base 6 is smaller partly or wholly than that of the resin layers 8-1 and 8-2 to the opening sealing member 14. In this case, adhesion of the resin layers 8-1 and 8-2 to the opening sealing member 14 can be kept even if the resin layers 8-1 and 8-2 and the base 6 adhering to each other are separated by heating.

It is preferred that the difference in expansion coefficient between the base 6 and the resin layers 8-1 and 8-2 is greater than that between the opening sealing member 14 and the resin layers 8-1 and 8-2. In this case, the force occurring at the boundary portions 15-1 and 15-2 due to heating becomes greater than that occurring at a boundary portion 15-3 between the opening sealing member 14 and the resin layer 8-1 due to heating.

The differences in adhesive force and in expansion coefficient can be adjusted by e.g. adjusting combinations of materials of the base 6, the resin layers 8-1 and 8-2, and the opening sealing member 14. To increase the adhesive force of the resin layers 8-1 and 8-2 to the opening sealing member 14, the surface-treated opening sealing member 14 may be adhered to the resin layers 8-1 and 8-2. The surface treatment for the opening sealing member 14 is e.g. a surface excision to remove a deposit such as a mold release agent. In the case that the resin layers 8-1 and 8-2 are separated from the base 6 in the capacitor 2 heated at the mounting processing temperature, the adhesive force of the resin layers 8-1 and 8-2 to the base 6 can be determined to be smaller than the force occurring at the boundary portions 15-1 and 15-2. In the case that the resin layers 8-1 and 8-2 continue to adhere to the base 6 in the capacitor 2 heated at the mounting processing temperature, the adhesive force can be determined to be equal to or greater than the force occurring at the boundary portions 15-1 and 15-2.

The capacitor main body 4 can solely be used as a capacitor. The capacitor element 12 is sealingly enclosed in the outer package case 10, with the opening sealing member 14 being fitted to an opening of the outer package case 10. The opening sealing member 14 is made of e.g. insulating rubber.

The outer package case 10 is e.g. a bottomed cylindrical aluminum case. A tip portion of the opening of the outer package case 10 is bent substantially at a right angle so that an end portion (hereinafter, referred to as "open end") opposite to a bottom of the outer package case 10 has a flat surface.

The capacitor element 12 is a winding element in which an anode foil, a cathode foil, and a separator interposed between the anode foil and the cathode foil are wound, with terminal leads 16-1 and 16-2 being derived from the same element plane. This capacitor element 12 is infiltrated with electrolyte.

The terminal leads 16-1 and 16-2 are made of e.g. highly conductive metal. The terminal lead 16-1 is an anode-side terminal and includes a lead portion derived from the anode foil of the capacitor element 12 and a terminal portion to be mounted on the wiring board. The lead portion and the terminal portion are connected together and integrated by welding or the like. The terminal lead 16-2 is a cathode-side terminal and includes a lead portion derived from the cathode foil of the capacitor element 12 and a terminal portion to be mounted on the wiring board. Similarly to the terminal lead 16-1, the lead portion and the terminal portion are connected together and integrated by welding or the like. The lead portion is e.g. cylindrical, and the terminal portion has e.g. a rectangular shape in cross-section with its flattened mounting surface toward the wiring board. The terminal leads 16-1 and 16-2 pass through the opening sealing member 14 and are exposed on the outside of the capacitor main body 4.

The base 6 is disposed toward the opening sealing member 14 of the capacitor main body 4. The base 6 is made of an insulation plate of insulating synthetic resin or the like. The insulating synthetic resin has heat resistance enough to withstand heating when mounted on the wiring board, and is e.g. polyester resin such as polybutylene terephthalate (PBT), polybutylene naphthalate (PBN), and polyethylene terephthalate (PET); polyamide resin such as nylon; polyphenylene sulfide (PPS); polyphenylene oxide (PPO); urea resin; liquid crystal polymer (LCP); phenol resin; or epoxy resin. The base 6 includes the insertion through holes 18-1 and 18-2, a protruding portion 20, a circumferential wall 22, and guide grooves 24-1 and 24-2. The base 6 includes, as shown in A of FIG. 2, support protuberances 26-1 and 26-2, a resin injection hole 30, a through hole 32, and a shielding portion 34, and includes, as shown in B of FIG. 2, step portions 36 and 38 and support portions 40.

The insertion through holes 18-1 and 18-2 are holes formed at positions corresponding to the terminal leads 16-1 and 16-2. The pair of terminal leads 16-1 and 16-2 projecting from the capacitor main body 4 pass through the pair of insertion through holes 18-1 and 18-2 formed in the base 6 and are derived to the outer surface side of the base 6, e.g. the mounting surface side of the base 6. The sectional shape of the insertion through holes 18-1 and 18-2 is e.g. a rectangle with rounded corners, as shown in A of FIG. 2.

The protruding portion 20 is disposed on the main body disposition surface of the base 6. The protruding portion 20 is formed around the insertion through holes 18-1 and 18-2 so as to surround the insertion through holes 18-1 and 18-2. The protruding portion 20 faces the opening sealing member 14 and partitions the insertion through holes 18-1 and 18-2 and the resin layer 8-1 adjacent to the protruding portion 20. The height of the protruding portion 20 is set to e.g. a height difference H (B of FIG. 1) between the outer surface of the opening sealing member 14 and the main body disposition surface of the base 6. If the height of the protruding portion 20 is the height difference H, the base 6 and the open end of the outer package case 10 come into contact with each other, while the opening sealing member 14 and the protruding portion 20 of the base 6 come into contact with each other. Since the outer package case 10 and the protruding portion 20 function as support portions, the base 6 is stably disposed and the capacitor main body 4 is supported by both the circumferential portion and the central portion. The protruding portion 20 in contact with the opening sealing member 14 can restrain, at a higher level, resin injected into between the base 6 and the opening sealing member 14 for formation of the resin layer 8-1 from entering the insertion through holes 18-1 and 18-2. Furthermore, contact of the protruding portion 20 with the opening sealing member 14 suppresses formation of a gap.

The protruding portion 20 has a substantially rectangular shape with a narrow part at its central portion in the longitudinal direction, as shown in e.g. A of FIG. 2. The protruding portion 20 has a retreat portion 44 at the central portion in the longitudinal direction, which retreat portion 44 forms the narrow part. The protruding portion 20 has flat portions 46 at its ends in the longitudinal direction. For example, the protruding portion 20 has an outline symmetrical with respect to a virtual line L1 shown in A of FIG. 2 and has a shape symmetrical with respect to the center line L2 shown in A of FIG. 2. The virtual line L1 is a line joining the insertion through hole 18-1 and the insertion through hole 18-2, and the center line L2 is a line extending through an intermediate point O between the insertion through hole 18-1 and the insertion through hole 18-2, the center line L2 being a line orthogonal to the virtual line L1.

The protruding portion 20 has groove portions 48 and 50 on the surface facing the opening sealing member 14. The groove portion 48 is formed so that a middle portion between the insertion through hole 18-1 and the insertion through hole 18-2 partly has a lower height, and the groove portion 48 extends toward the resin injection hole 30 and toward the through hole 32 to form a resin path. The groove portion 48 can regulate a flow rate of resin flowing through the groove portion 48 according to the width of the groove portion 48.

The groove portions 50 each extend from one of the flat portions 46 of the protruding portion 20 to one of the insertion through holes 18-1 and 18-2 to form a ventilation path. The groove portions 50 enable air extruded by the injection of resin to be exhausted through the groove portions 50 to the outside. For the formation of the resin layer 8-2, the groove portions 50 may allow a part of injected resin to pass through so that the resin can reach the insertion through holes 18-1 and 18-2. The width, the depth, the disposition interval or the installation quantity of the groove portions 50 are appropriately set considering e.g. the passage of air and the suppression of intrusion of resin. The groove portions 50 are formed on e.g. only the surface toward the through hole 32 of the protruding portion 20. The resin is therefore restrained from directly flowing through the groove portions 50 into the insertion through holes 18-1 and 18-2. That is, resin injected from the resin injection hole 30 flows into a space on the side of the through hole 32, of a space between the opening sealing member 14 and the base 6, due to an injection pressure, and thereafter is pushed in the groove portions 50 by a pressing force of resin filled into the space, so that resin can be fed into the groove portions 50 at a pressure lower than the injection pressure. This enables the amount of resin flowing into the insertion through holes 18-1 and 18-2 to be regulated to the extent preventing resin from arriving at the mounting surface of the base 6 to affect connectivity between the wiring board and the terminal leads 16-1 and 16-2.

The circumferential wall 22 is arranged at a peripheral part of the base 6, i.e. outside of the open end of the outer package case 10 to surround the open end of the outer package case 10. The inner surface of the circumferential wall 22 has a circular shape in cross-section so as to follow the outer circumference of the bottomed cylindrical outer package case 10. The circumferential wall 22 may be higher than the protruding portion 20 or may be level with or lower than the protruding portion 20.

The guide grooves 24-1 and 24-2 are formed on the mounting surface of the base 6 and extend from the insertion through holes 18-1 and 18-2 to the outside. The terminal portions of the terminal leads 16-1 and 16-2 are bent in the opposite directions along the guide grooves 24-1 and 24-2 and are arranged in the guide grooves 24-1 and 24-2. The guide grooves 24-1 and 24-2 thus guide the terminal portions of the terminal leads 16-1 and 16-2. In place of the guide grooves 24-1 and 24-2, guide projections may be disposed on the mounting surface of the base 6. The stability of the capacitor 2 can be secured at the time of mounting by the guide grooves 24-1 and 24-2 or the guide projections.

The support protuberances 26-1 and 26-2 are an example of a protruding portion that supports the open end of the outer package case 10, are adjacent to the resin layer 8-1, and are partly formed at positions where the base 6 is in contact with the open end of the outer package case 10. As shown in A of FIG. 2, the support protuberances 26-1 and 26-2 are formed on the main body disposition surface of the base 6 inside of the circumferential wall 22. The support protuberance 26-1 has an arc shape with a width and covers the outside of the resin injection hole 30 and the protruding portion 20 in an arc shape. The support protuberance 26-2 has a circular shape and is arranged outside of the through hole 32. At the portions where the support protuberances 26-1 and 26-2 are formed, the open end of the outer package case 10 comes into contact with the support protuberances 26-1 and 26-2. In divided portions of the support protuberances 26-1 and 26-2, the open end of the outer package case 10 is apart from the base 6, so that a gap is formed between the base 6 and the open end of the outer package case 10. The gap between the base 6 and the open end of the outer package case 10 forms a resin path through which resin flows into between the circumferential wall 22 of the base 6 and the outer peripheral surface of the outer package case 10.

The resin injection hole 30 is formed on the center line L2, as shown in A of FIG. 2. The resin injection hole 30 is an example of the insertion through hole for use in injection of resin and is formed equidistant from the insertion through holes 18-1 and 18-2.

The through hole 32 is formed on the center line L2, as shown in A of FIG. 2. The through hole 32 is formed at e.g. a termination end into which resin finally flows in the injection of resin and is used to check the resin that has reached the termination end along a resin injection path. This through hole 32 is used also to exhaust air pushed out by injecting resin and facilitates checking the resin filling state as well as exhausting air.

The shielding portion 34 is arranged around the through hole 32 and between the through hole 32 and the resin injection hole 30. The shielding portion 34 suppresses resin injected from the resin injection hole 30 from entering the through hole 32 from the side of the resin injection hole 30 with respect to the through hole 32. That is, the shielding portion 34 suppresses the through hole 32 from being filled with resin before resin spreads in a formation region of the resin layer 8-1. The shielding portion 34 surrounds a part, e.g. two-thirds of the circumference of the through hole 32. It is preferred that the shielding portion 34 surrounds 50 percent or more, and desirably 66 percent or more of the circumference of the through hole 32. For example, as shown in A of FIG. 2, 10 percent of the circumference of the through hole 32 may be open without being surrounded by the shielding portion 34.

The step portion 36 is formed on the mounting surface of the base 6 and around the resin injection hole 30, as shown in B of FIG. 2. The step portion 36 is used for e.g. alignment of a resin injector connected to the resin injection hole 30 when injecting resin. The step portion 36 provides a space for preventing resin in the vicinity of the resin injection hole 30 from projecting from the mounting surface of the base 6.

The step portion 38 is formed on the mounting surface of the base 6 and around the through hole 32, as shown in B of FIG. 2. The step portion 36 provides a space for preventing resin in the vicinity of the through hole 32 from projecting from the mounting surface of the base 6.

The support portions 40 are formed on the mounting surface of the base 6 and in the vicinity of corners of the base 6, as shown in B of FIG. 2. The support portions 40 can stabilize the posture of the capacitor 2 by point contact in the state where the capacitor 2 is mounted on the wiring board.

The resin layer 8-1 is disposed between the base 6 and the opening sealing member 14, outside of the protruding portion 20 and inside of the open end of the outer package case 10. This resin layer 8-1 seals the outer surface of the opening sealing member 14. The resin layer 8-2 is disposed within the interiors of the insertion through holes 18-1 and 18-2. This resin layer 8-2 suppresses gaps between the inner surfaces of the insertion through holes 18-1 and 18-2 and the terminal leads 16-1 and 16-2. The resin layers 8-1 and 8-2 enable discharge of electrolytic solution that has arrived at the outside of the opening sealing member 14, while enhancing the hermetically sealing performance of the capacitor main body 4. The resin injected from the resin injection hole 30 may reach the interiors of the insertion through holes 18-1 and 18-2 to form the resin layer 8-2, or the resin may be applied from the mounting surface of the base 6 to form the resin layer 8-2.

Resin forming the resin layers 8-1 and 8-2 is e.g. sealing resin sealing the outer side of the opening sealing member 14, and is liquid at the time of filling, but solidifies after filling. At the time of filling, liquid resin fills the gap between the capacitor main body 4 and the base 6 and partly fills the interiors of the insertion through holes 18-1 and 18-2, and after filling, resin becomes solidified to form the resin layers 8-1 and 8-2. Resin forming the resin layers 8-1 and 8-2 has an affinity for the base 6, the outer package case 10, and the opening sealing member 14 and has a gas blocking property. It is preferred that the resin has a linear expansion coefficient closer to that (approx. $23 \times 10^{-6}/°$ C.) of aluminum, a less shrinkage when curing, and non-hygroscopicity. Resin can be e.g. epoxy resin, alkyd resin, urethane resin, thermosetting resin, or UV curable resin. Epoxy resin may be two-component mixed epoxy resin using acid anhydride or one-component epoxy resin.

[Capacitor Manufacturing Process]

A capacitor manufacturing process is an example of a capacitor manufacturing method of the present disclosure and includes a formation step of the capacitor main body 4, a formation step of the base 6, an attachment step of attaching the base 6 to the capacitor main body 4, a forming step of the terminal leads 16-1 and 16-2, and a resin injection step.

At the formation step of the capacitor main body 4, a separator is first interposed between the anode foil to which the terminal lead 16-1 is connected and the cathode foil to which the terminal lead 16-2 is connected, and then the anode foil, the cathode foil, and the separator are wound to form the capacitor element 12. The capacitor element 12 is infiltrated with the electrolyte, the capacitor element 12 is enclosed in the outer package case 10, and the opening sealing member 14 is then fitted to the opening of the outer package case 10 to form the capacitor main body 4. The outer package case 10 is made of aluminum for example.

At the formation step of the base 6, the base 6 is formed from insulating synthetic resin into the already-described shape. Although in this embodiment, the electrolytic capacitor has been formed by infiltrating the capacitor element 12 with the electrolyte, the electrolytic capacitor is not limitative. The capacitor 2 may also be a hybrid type capacitor in which electrolyte is infiltrated into the capacitor element 12 having a solid electrolyte layer impregnated with a conductive polymer.

At the attachment step of the base 6, the terminal leads 16-1 and 16-2 of the capacitor main body 4 are penetrated through the insertion through holes 18-1 and 18-2 of the base 6. The base 6 is then moved to be attached to the opening sealing member 14 side of the capacitor main body 4. At this attachment step, the protruding portion 20 of the base 6 is arranged toward the opening sealing member 14.

At the forming step of the terminal leads 16-1 and 16-2, the terminal leads 16-1 and 16-2 are bent along the guide grooves 24-1 and 24-2 so that the terminal portions of the terminal leads 16-1 and 16-2 are arranged in the guide grooves 24-1 and 24-2. By this forming step, the base 6 is fixed to the capacitor main body 4.

At the resin injection step, liquid resin injected through the resin injection hole 30 of the base 6 is filled into the gap between the capacitor main body 4 and the base 6. The resin spreads around the resin injection hole 30 and simultaneously flows toward the through hole 32 through the groove portion 48 or gaps between the protruding portion 20 and the support protuberance 26-1 to consequently spread around the through hole 32 and the shielding portion 34. A part of the resin flows through the outer side of the edge of the support protuberance 26-1 to the outside of the capacitor main body 4. A part of the resin may flow through the groove portion 50 into the interiors of the insertion through holes 18-1 and 18-2. The injected resin forms the resin layer 8-1 between the capacitor main body 4 and the base 6 and forms the resin layer 8-2 within the interiors of the insertion through holes 18-1 and 18-2. A resin injector such as a dispenser is used for the resin injection, for example.

[Mounting of Capacitor onto Wiring Board]

A capacitor mounting step is an example of a capacitor mounting method of the present disclosure, is e.g. a capacitor reflow soldering process, and includes e.g. a solder applying step, a capacitor fitting step, and a heating step.

At the solder applying step, solder paste is applied by e.g. screen printing to a land of the wiring board. The solder paste contains a flux and a plurality of solder particles dispersed in the flux.

At the capacitor fitting step, the capacitor 2 is fitted via the solder paste to the wiring board such that the terminal leads 16-1 and 16-2 of the capacitor 2 come into contact with the solder paste on the land.

At the heating step, the wiring board and the capacitor 2 placed on the wiring board are loaded into a heating furnace such as a reflow furnace to be heated at the mounting processing temperature described above. The solder paste turns into solder by heat treatment, allowing the capacitor 2 to be joined to the wiring board. The capacitor 2 is therefore mounted on the wiring board.

At this heating step, a force is generated by the expansion difference between the base 6 and the resin layers 8-1 and 8-2 and acts on the adhered boundary portions 15-1 and 15-2. In consequence, the resin layers 8-1 and 8-2 become separated from the base 6 partly or wholly along the boundary portions 15-1 and 15-2. The separated boundary portions 15-1 and 15-2 form separated surfaces. The separated surfaces may be contact surfaces including two surfaces in contact with each other or may be spaced-apart surfaces including two surfaces spaced apart from each other. In the present description, "separation" is used as a term representing that two objects adhered together separate into non-adhered objects. "Separated surfaces" are surfaces formed by the separation of the base 6 from the resin layers 8-1 and 8-2.

Figure 3:
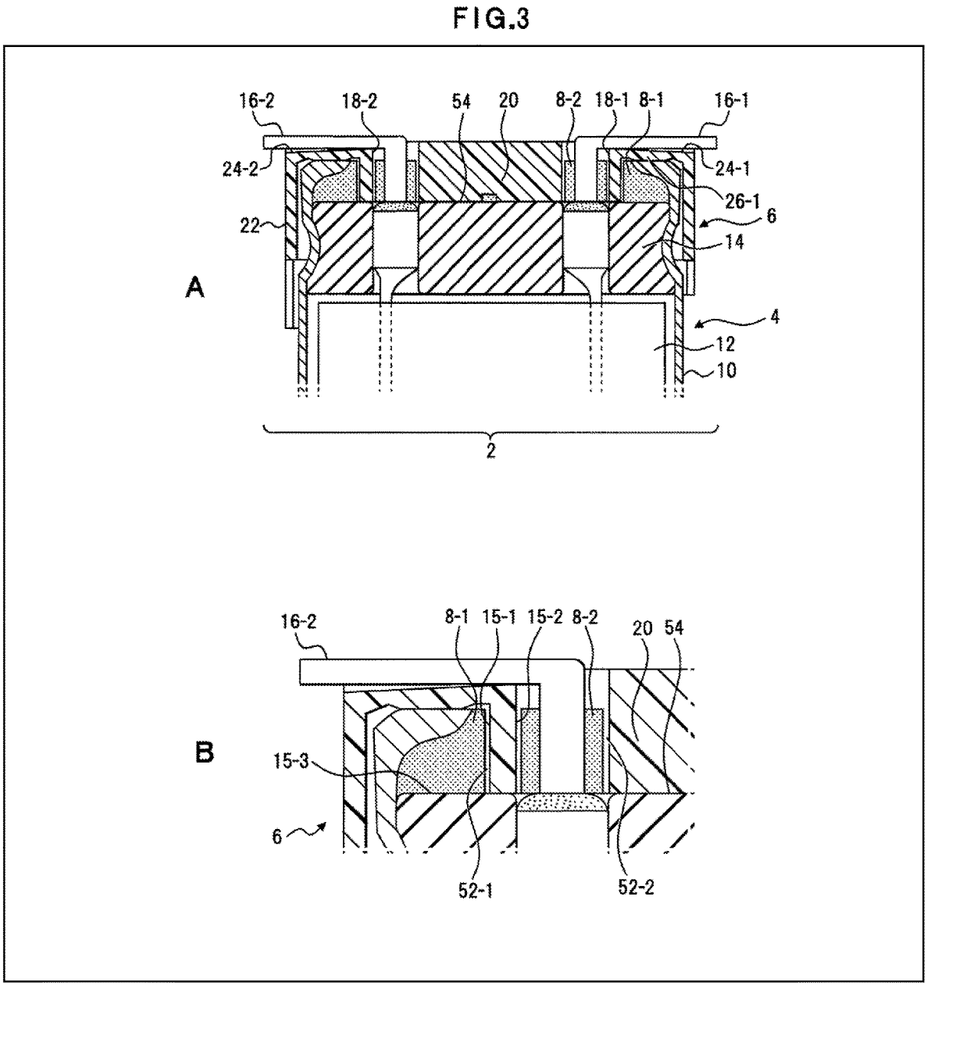
FIG. 3 shows section views of an example of the capacitor after heating.

The capacitor 2 after the heating step has e.g. the spaced-apart surfaces formed by the boundary portions 15-1 and 15-2, as shown in FIG. 3. The spaced-apart surfaces include surfaces spaced apart from each other and form gas paths 52-1 and 52-2. In the capacitor 2 after the heating step, a boundary portion 54 between the protruding portion 20 and the opening sealing member 14 communicates to the outside of the capacitor 2 by way of the gas paths 52-1 and 52-2.

According to the first embodiment, the following functions or effects are obtained.

(1) Electrolyte gas having passed through the opening sealing member 14 flows between the contact surfaces, the spaced-apart surfaces, the separated surfaces, or a plurality of surfaces of these, formed by the boundary portions 15-1 and 15-2. The electrolyte gas flows e.g. along arrows indicated in FIG. 4. The gas flowing through the boundary portion 15-2 is exhausted to the exterior of the capacitor 2. Since between the support protuberances 26-1 and 26-2 the capacitor main body 4 is spaced apart from the base 6, the gas flowing through the boundary portion 15-1 is also exhausted to the exterior of the capacitor 2. This suppresses the electrolyte gas from staying between the terminal leads 16-1 and 16-2, avoiding lowering in insulation resistance between the terminal leads 16-1 and 16-2. This leads to e.g. a lowered risk of short circuit between the terminal leads 16-1 and 16-2.

Figure 4:
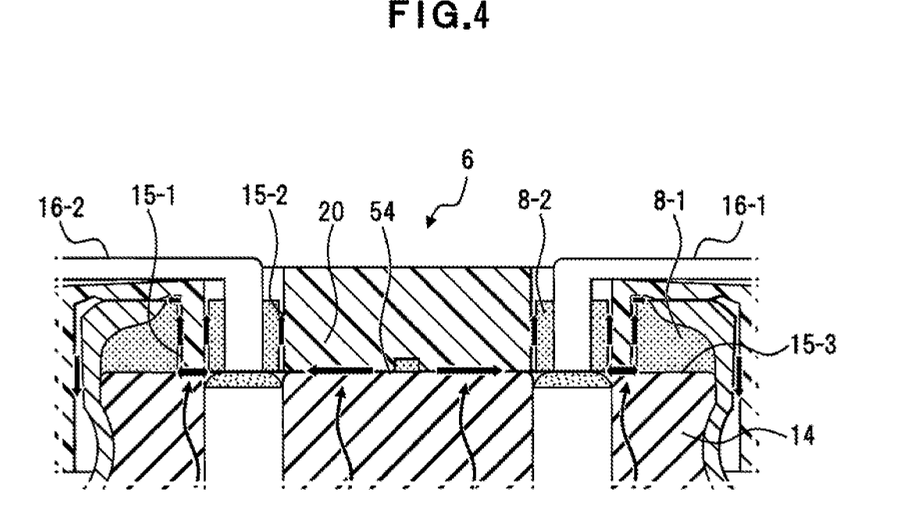
FIG. 4 shows a view for explaining effects of the capacitor.

(2) Separation of the heated resin layer 8-1 from the base 6 reduces the force applied to the boundary portion 15-3 between the opening sealing member 14 and the resin layer 8-1, allowing adhesion of the resin layer 8-1 to the opening sealing member 14 to be kept. As a result, an adhered portion of the resin layer 8-1 and the opening sealing member 14 can suppress transpiration of electrolyte, enabling the capacitor 2 to have enhanced stability. Furthermore, adhesion of the resin layer 8-1 to the opening sealing member 14 is kept, increasing the vibration resistance.

Second Embodiment

In the first embodiment, the resin layers 8-1 and 8-2 are separated from the base 6 to form the separated surfaces at the capacitor mounting step. In the second embodiment, prior to the capacitor mounting step, the resin layers 8-1 and 8-2 are separated from the base 6 so that the separated surfaces are formed. That is, previous to the capacitor mounting step, the capacitor 2 according to the second embodiment has the already-described contact surfaces, the spaced-apart surfaces, the separated surfaces, or the plurality of surfaces of these. The capacitor 2 of the second embodiment is the same as or similar to the capacitor 2 after the mounting step according to the first embodiment, which will not again be described.

The separated surfaces are formed when e.g. the resin layers 8-1 and 8-2 before curing (i.e. liquid resin) is cured (curing step). For example, at the curing step, the resin shrinks and separates from the base 6 so that the separated surfaces are formed. The amount of shrinkage of resin during curing may be regulated by changing the shrinkage factors such as resin type, inner pressure of resin before curing, or curing conditions, for example. The separated surfaces according to the second embodiment may be formed by a heating step different from the mounting step and the curing step. The time to form the separated surfaces is not limited to the time during which the mounting step or the curing step is curried out.

According to the second embodiment, the following functions or effects are obtained.

(1) The functions or effects described already in the first embodiment are obtained.

(2) Since the capacitor 2 has the contact surfaces, the spaced-apart surfaces, the separated surfaces, or the plurality of surfaces of these without depending on the capacitor mounting step, the functions or effects described already in the first embodiment are obtained by the capacitor 2 before mounting on the wiring board.

Features, advantages, or variants, etc. of the above embodiments will be enumerated below.

(1) In the above embodiments, combinations of materials are used to adjust the adhesive force of the resin layers 8-1 and 8-2 to the base 6 and the adhesive force of the resin layers 8-1 and 8-2 to the opening sealing member 14. However, these adhesive forces may be increased or decreased e.g. by treating the surface of the base 6 or the opening sealing member 14 with a surface treatment agent such as a primer, a fluorine-based coating agent, or a silicone-based coating agent. Since the surface treatment agent can expand the range of adhesive force adjustment, for example, burdens are alleviated when forming the contact surfaces, the spaced-apart surfaces, the separated surfaces, or the plurality of surfaces of these.

(2) In the spaced-apart surfaces of the capacitor 2 shown in FIG. 3, for convenience of illustration, the resin layers 8-1 and 8-2 are definitely spaced apart from the base 6. However, the spaced-apart surfaces may form therebetween a small gap allowing passage of gaseous electrolyte.

Figure 5:
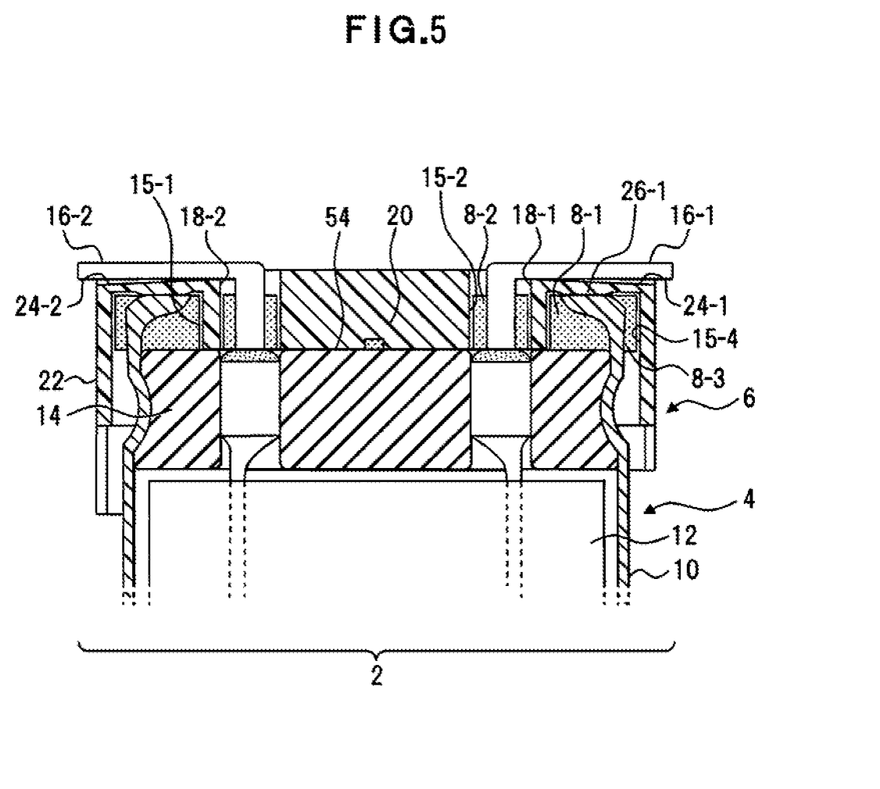
FIG. 5 shows a view of an example of a capacitor according to a variant.

(3) The capacitor 2 may include a resin layer 8-3 in addition to the resin layers 8-1 and 8-2, as shown in FIG. 5. The resin layer 8-3 is arranged between the circumferential wall 22 of the base 6 and the side surface of the outer package case 10. The resin layer 8-3 suppresses a gap between the circumferential wall 22 and the outer package case 10 and restrains the relative movement between the capacitor main body 4 and the base 6, enhancing the vibration resistance of the capacitor 2.

The resin layer 8-3 faces the circumferential wall 22 of the base 6 via a boundary portion 15-4. The boundary portion 15-4 is formed by a facing surface on the resin layer 8-3 side and a facing surface on the base 6 side. The adhesive force of the resin layer 8-3 to the base 6 is the same as or similar to the adhesive force of the resin layers 8-1 and 8-2 to the base 6 already described in the first embodiment. The boundary portion 15-4 may be the contact surfaces, may be the spaced-apart surfaces, may be the adhered surfaces, may be the separated surfaces, or may be the plurality of surfaces of these. Since the capacitor main body 4 is spaced apart from the base 6 between the support protuberances 26-1 and 26-2, the boundary portion 15-1 connects to the boundary portion 15-4. Gas flowing through the boundary portion 15-1 can pass through the gap between the base 6 and the open end of the outer package case 10 and then through the boundary portion 15-4, to be exhausted to the exterior of the capacitor.

(4) The protruding portion 20 may simply surround the insertion through holes 18-1 and 18-2 and may appropriately be changed without being limited to the already-described shape. For example, the base 6 may have two protruding portions which surround the insertion through holes 18-1 and 18-2, respectively. The groove portions 48 and 50 may be disposed if necessary.

(5) In the above embodiments, the base 6 has the resin injection hole 30 into which resin is injected after the disposition of the base 6 on the capacitor main body 4, to form the resin layers 8-1 and 8-2, but it may appropriately be changed. Resin may be applied to the capacitor main body 4 or the base 6, and thereafter the base 6 may be attached to the opening sealing member 14 side of the capacitor main body 4, while resin may be spread between the capacitor main body 4 and the base 6 so that the resin fills the gap between the capacitor main body 4 and the base 6. The resin filling the gap between the capacitor main body 4 and the base 6 will form the resin layer 8-1. According to such a configuration, there is no need to dispose the resin injection hole 30.

(6) The height of the protruding portion 20 may be lower or higher than the height difference H. The protruding portion 20 lower than the height difference H can suppress resin to form the resin layer 8-1 from entering the insertion through holes 18-1 and 18-2. A gap is formed between the protruding portion 20 and the opening sealing member 14, and can form an air and resin flow path to the insertion through holes 18-1 and 18-2 of the base 6. When the gap remaining between the protruding portion 20 and the opening sealing member 14 is connected to the boundary portions 15-1 and 15-2, gas in the gap can pass through the boundary portions 15-1 and 15-2 to be exhausted to the exterior of the capacitor 2.

The protruding portion 20 higher than the height difference H can come into contact with the opening sealing member 14 to suppress, at a higher level, resin injected into between the base 6 and the opening sealing member 14 from entering the insertion through holes 18-1 and 18-2. A gap is formed between the base 6 and the open end of the outer package case 10, and can form an air flow path.

As above, the most preferred embodiment and the like of the present disclosure have been described, but the technique of the present disclosure is not limited to the above description, and those skilled in the art can naturally make various modifications and changes thereto on the basis of the gist of the invention described in the appended claims or disclosed in the description. The modifications and changes are obviously encompassed in the scope of the present disclosure.

INDUSTRIAL APPLICABILITY

The techniques of the present disclosure can widely be utilized in electronic devices and are useful.

REFERENCE SIGNS LIST

2 capacitor
4 capacitor main body
6 base
8-1, 8-2, 8-3 resin layer
10 outer package case
12 capacitor element
14 opening sealing member
15-1, 15-2, 15-3, 15-4, 54 boundary portion
16-1, 16-2 terminal lead
18-1, 18-2 insertion through hole
20 protruding portion
22 circumferential wall
24-1, 24-2 guide groove
26-1, 26-2 support protuberance
30 resin injection hole
32 through hole
34 shielding portion
36, 38 step portion
40 support portion
44 retreat portion
46 flat portion
48, 50 groove portion
52-1, 52-2 gas path
54 boundary portion

The invention claimed is:

1. A capacitor comprising:
a capacitor main body including an outer package case, an opening sealing member attached to an opening of the outer package case, and a terminal lead extending through the opening sealing member;
a base disposed toward the opening sealing member of the capacitor main body, the base including an insertion through hole into which the terminal lead is inserted to be exposed on a mounting surface side, and a protruding portion surrounding the insertion through hole; and
a resin layer arranged at least between the base and the opening sealing member, wherein
the base and the resin layer are at least partly in contact with or spaced apart from each other without adhering to each other; or an adhesive force of the resin layer to the base is smaller than a force that thermal deformation at a mounting processing is to generate between the base and the resin layer, and
a boundary portion between the base and the resin layer includes contact surfaces, spaced-apart surfaces, or contact surfaces and spaced-apart surfaces, of the base and the resin layer, the boundary portion forming a gas path for allowing passage of gas.

2. The capacitor of claim 1, wherein
the adhesive force of the resin layer to the base is smaller, at least partly, than an adhesive force of the resin layer to the opening sealing member.

3. The capacitor of claim 2, wherein
a difference in expansion coefficient between the base and the resin layer is greater than a difference in expansion coefficient between the opening sealing member and the resin layer.

4. The capacitor of claim 3, wherein
the resin layer is further arranged within interior of the insertion through hole.

5. The capacitor of claim 2, wherein
the resin layer is further arranged within interior of the insertion through hole.

6. The capacitor of claim 2, wherein
the base further includes a circumferential wall arranged outside of the outer package case, and wherein
the resin layer is further arranged between the circumferential wall and the outer package case.

7. A capacitor mounting method comprising:
a fitting step of fitting a capacitor of claim 2 to a circuit board via solder; and
a reflow step of subjecting the solder to heat treatment to join the circuit board and the capacitor together, wherein
the heat treatment separates the base from the resin layer so that a gas path is formed.

8. The capacitor of claim 1, wherein
a boundary portion between the protruding portion and the opening sealing member communicates via the gas path to exterior of the capacitor.

9. The capacitor of claim 8, wherein
the resin layer is further arranged within interior of the insertion through hole.

10. A capacitor mounting method comprising:
a fitting step of fitting a capacitor of claim 8 to a circuit board via solder; and
a reflow step of subjecting the solder to heat treatment to join the circuit board and the capacitor together, wherein
the heat treatment separates the base from the resin layer so that a gas path is formed.

11. The capacitor of claim 1, wherein
the resin layer is further arranged within interior of the insertion through hole.

12. The capacitor of claim 11, wherein
the base further includes a circumferential wall arranged outside of the outer package case, and wherein
the resin layer is further arranged between the circumferential wall and the outer package case.

13. A capacitor mounting method comprising:
a fitting step of fitting a capacitor of claim 11 to a circuit board via solder; and
a reflow step of subjecting the solder to heat treatment to join the circuit board and the capacitor together, wherein
the heat treatment separates the base from the resin layer so that a gas path is formed.

14. The capacitor of claim 1, wherein
the base further includes a circumferential wall arranged outside of the outer package case, and wherein
the resin layer is further arranged between the circumferential wall and the outer package case.

15. A capacitor mounting method comprising:
a fitting step of fitting a capacitor of claim 14 to a circuit board via solder; and
a reflow step of subjecting the solder to heat treatment to join the circuit board and the capacitor together, wherein
the heat treatment separates the base from the resin layer so that a gas path is formed.

16. A capacitor mounting method comprising:
a fitting step of fitting a capacitor of claim 1 to a circuit board via solder; and
a reflow step of subjecting the solder to heat treatment to join the circuit board and the capacitor together, wherein
the heat treatment separates the base from the resin layer so that a gas path is formed.

17. A capacitor manufacturing method comprising:
making a capacitor main body including an outer package case, an opening sealing member attached to an opening of the outer package case, and a terminal lead extending through the opening sealing member;
making a base including an insertion through hole and a protruding portion surrounding the insertion through hole;
disposing the base toward the opening sealing member of the capacitor main body and inserting the terminal lead into the insertion through hole to be exposed on a mounting surface side; and
forming a resin layer between the base and the opening sealing member, wherein
the base and the resin layer are at least partly in contact with or spaced apart from each other without adhering to each other; or an adhesive force of the resin layer to the base is smaller than a force that thermal deformation at a mounting processing is to generate between the base and the resin layer, and
a boundary portion between the base and the resin layer includes contact surfaces, spaced-apart surfaces, or contact surfaces and spaced-apart surfaces, of the base and the resin layer, the boundary portion forming a gas path for allowing passage of gas.

* * * * *